United States Patent [19]

Houchin et al.

[11] Patent Number: 5,047,861
[45] Date of Patent: Sep. 10, 1991

[54] METHOD AND APPARATUS FOR PIXEL NON-UNIFORMITY CORRECTION

[75] Inventors: James S. Houchin; Kenneth A. Parulski, both of Rochester, N.Y.

[73] Assignee: Eastman Kodak Company, Rochester, N.Y.

[21] Appl. No.: 561,437

[22] Filed: Jul. 31, 1990

[51] Int. Cl.$^5$ ............................................. H04N 5/335
[52] U.S. Cl. ........................... 358/213.15; 358/213.16; 358/213.17; 358/29 C; 358/164; 358/168; 358/174; 358/166
[58] Field of Search ....................... 358/213.15, 213.16, 358/213.17, 113, 29 C, 213.11, 174, 163, 162, 169, 168, 160, 166, 164

[56] References Cited

U.S. PATENT DOCUMENTS

| 4,216,503 | 8/1980 | Wiggins | 358/213.16 |
|---|---|---|---|
| 4,602,291 | 7/1986 | Temes | 358/213.17 |
| 4,698,685 | 10/1987 | Beaverson | 358/213.15 |
| 4,833,533 | 5/1989 | Augusti | 358/29 C |
| 4,835,606 | 5/1989 | Peck | 358/213.16 |
| 4,839,866 | 6/1989 | Ward | 365/78 |
| 4,894,721 | 1/1990 | Matsuda | 358/213.17 |
| 4,912,558 | 3/1990 | Easterly | 358/213.16 |
| 4,920,428 | 4/1990 | Lin | 358/213.16 |

Primary Examiner—Howard W. Britton
Assistant Examiner—Sherrie Hsia
Attorney, Agent, or Firm—Edward Dugas

[57] ABSTRACT

An apparatus for reading and correcting an image including: a sensor which receives light and converts it to electrical signals; a digitizing unit to convert the analog image signal to a digital signal; a calibration unit to capture calibration data for each pixel under known illumination conditions and to produce individual correction values for each pixel and a correction unit comprised of a look-up table addressed by both the digital image signal and the correction values which corrects the digital image data.

12 Claims, 8 Drawing Sheets

METHOD AND APPARATUS FOR PIXEL NON-UNIFORMITY CORRECTION

BACKGROUND OF THE INVENTION

1. Field of the Invention

The present invention relates to the field of image processing and more particularly to an apparatus for reading and correcting a sensed color image on an individual pixel basis.

2. Discussion of the Background

Images are sensed and converted by a system into digital signals in a process commonly called the capture/digitization process. Degradations which are inherent in a capture system, in turn, limit the quality of the digitized image. If the degradations are repeatable and are known, it is possible to form correction factors which can be applied automatically to improve the quality of the digitized image. Two types of corrections that are of particular interest to the applicability of the present invention are pixel by pixel gain correction and pixel by pixel offset correction. Normally, these two operations are performed in a serial fashion. First, a "black correction" offset value appropriate for each pixel is subtracted from each captured pixel value. The result is then multiplied by the appropriate gain value for each pixel, resulting in a corrected image. Thus both functions, addition and multiplication, must be implemented. The corrected pixel values are often converted to a different quantization space using a digital memory look-up table, such as a RAM or ROM, programmed to provide, for example, a logarithmic or a gamma-correction quantization function.

A patent of interest for its teachings in this area is U.S. Pat. No. 4,745,466 entitled "Digital Color Image Processing Apparatus with Color Masking Processing Unit Addressed by a plurality of Multi-Bit Color Component Signals Using Various Combinations of the Bits of the Signals" by Yoshida et al.

In that patent, particularly with regards to the discussion with respect to FIG. 7-1, a solution to the problem of "shading" is proposed. The term "shading" as used in that patent implies an uneven optical image caused by various optical problems involving a light source, lens, and other factors. The shading correction solution uses RAM to store a signal value from each pixel during scanning of a white calibration plate. During normal image scanning, the stored values are used to address a ROM look-up table programmed to multiply the scanned pixel values by a number inversely proportional to the stored calibration values. Thus, the ROM look-up table functions as a divider circuit. Note that the shading correction circuit 130 is followed by gamma correction circuits 302, 305 and 308 in FIG. 8-1 of that patent, which are implemented as totally separate look-up tables.

Another patent of interest for its teachings is U.S. Pat. No. 4,891,692 entitled "Color Image Reading Apparatus Having Variable Exposure Control" by K. Outa.

In that patent, referencing specifically the discussion set forth in Columns 3 and 4, there is discussed the use of a standard white plate to correct for variations in the sensitivity of the image sensor. Each pixel of the CCD is corrected for its variation in sensitivity or in the light quantity which illuminates the corresponding point of the original image. In Column 4, a standard illumination signal is derived as Equation 1. Although a multiplier logic circuit could perform the multiplication function of the equation, it is stated that a high speed multiplier function could instead be realized by the use of a look-up table. Note that the outputs of the multiplier function 105 in FIG. 1 of that patent is followed by a logarithmic converter 109, which is implemented as a totally separate look-up table.

Some additional patents of interest that discuss solutions to gain and offset problems are U.S. Pat. No. 4,736,245 entitled "Calibration Method for Color Film Inspection System" by Seto et al. and U.S. Pat. No. 4,802,107, entitled "Offset Drift Correction Method In Color Film Inspection Apparatus" by Yamamoto et al.

SUMMARY OF THE INVENTION

The basis of the present invention is the understanding that a single look-up table can be programmed to effectively provide many cascaded operations, limited only by the number of input parameters required by the operations. As a simple example, since logarithmic conversion is a fixed function, both the gain correction and logarithmic conversion, (or alternately both gain correction and gamma correction), which use two separate look-up tables in the prior art system described, can be combined by properly programming the look-up table used for gain correction.

In the present invention there is provided a single, programmable look-up table, and a method for programming the table, which allows many corrections and conversions to be performed in one look-up table operation. The only restriction to the present implementation is that the input values must produce only one possible output value. The system can operate upon linear, logarithmic, or gamma corrected signals that are digitized, perform black level, offset correction, gain correction, or more elaborate corrections and then reconvert the signal to linear, logarithmic, or gamma corrected signals.

A primary object of the present invention to provide correction for captured and digitized image data, to reduce the effects of lens fall-off, imperfect illumination, and other defects in the capture/digitization process.

Another object of the present invention is to provide an apparatus for calculating individual correction values for each pixel for several known light levels.

Still another object of the present invention is to provide an apparatus for calculating individual correction values for each pixel for all light levels using the values calculated for known light levels.

Yet another object of the present invention is to provide an apparatus for storing correction values such that they may be sequentially accessed.

Still another object of the present invention is to provide apparatus for using the stored correction values to modify the image data.

And yet another object of the present invention is to perform corrections using available semiconductor memories instead of multipliers or adders.

These and other objects of the present invention will become more apparent when taken in conjunction with the following description and drawings wherein like characters constitute like parts and which drawings form a part of the present description.

DETAILED DESCRIPTION OF THE PREFERRED EMBODIMENT

Figure 1:
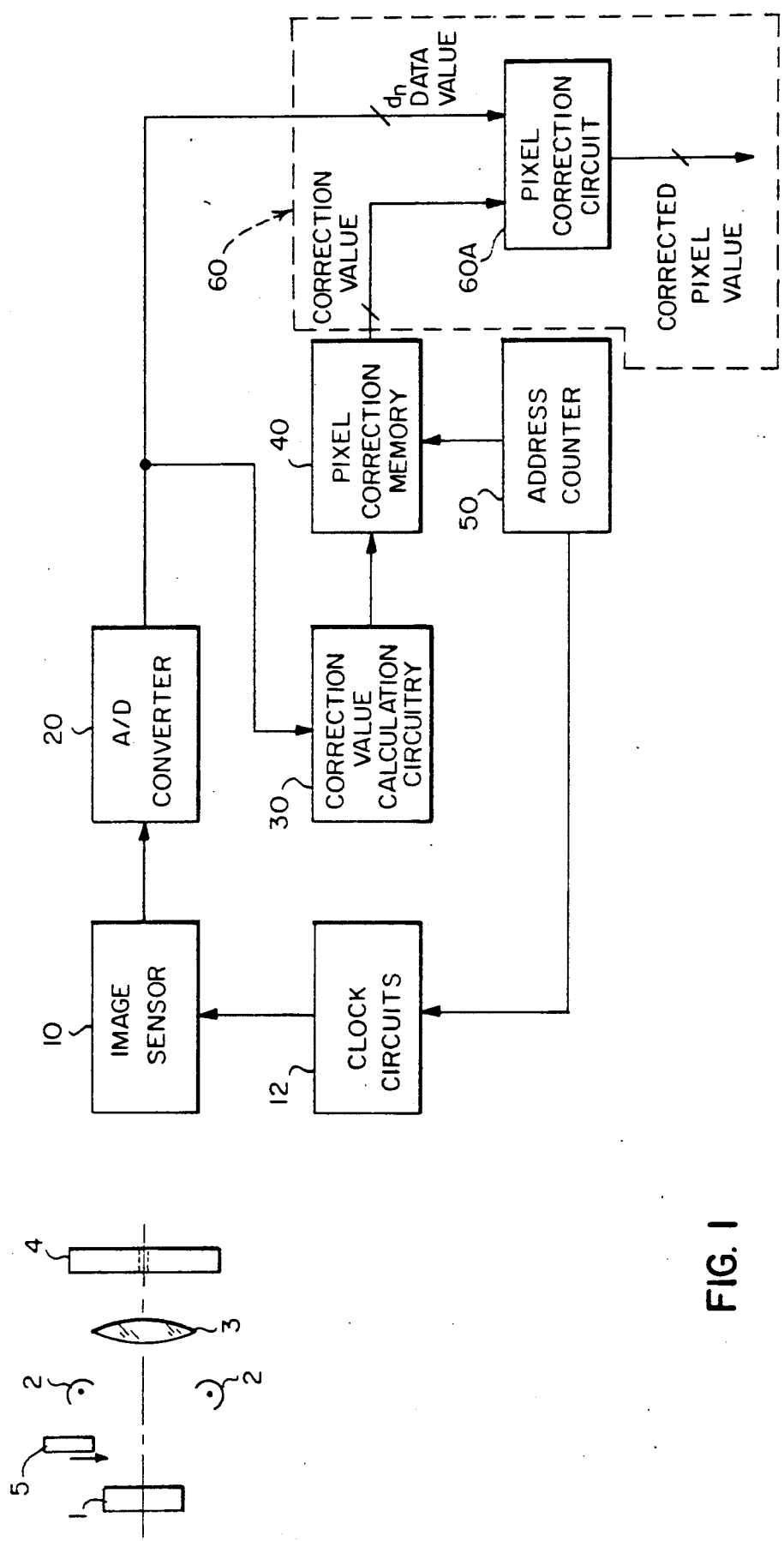
FIG. 1 is a block diagram of a preferred embodiment of the invention.

FIG. 1 illustrates a block diagram of a system for capturing and correcting an image. An object 1, which may be a reflection print or a film transparency, is illuminated by a light source 2. Light reflected (or in the case of a transparency, transmitted) from object 1 is directed by a lens 3 to an image sensor 10. The illumination level of the image sensor 10 is controlled by the size of the lens aperture 4. The image sensor 10 produces representative analog signals that are digitized by an A/D converter 20. When the scanner is in calibration mode, the output of the A/D converter 20 is directed to the input of a correction value calculation circuit 30. The correction values calculated in block 30 are stored in a pixel correction memory 40. The addressing of memory 40 is controlled by the output from address counter 50 which also controls the clock circuits 12 which control the readout sequence of image sensor 10. During normal scanning mode, the pixel correction memory 40 provides the appropriate correction value for each pixel on sensor 10 as its' signal value from A/D 20 appears at the input to the correction circuit 60. Within the correction block 60, a pixel correction circuit 60A receives the two inputs and applies the appropriate correction factors to the input pixel values in order to output the corrected pixel signal values.

Figure 2:
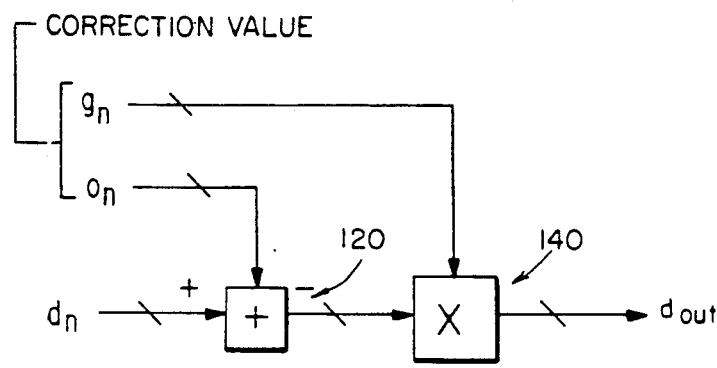
FIG. 2 illustrates a simple prior-art gain and offset correction circuit.

Referring to FIG. 2, a simple prior-art gain and offset correction circuit is shown incorporating a summing function 120 for subtracting offset correction values $O_n$ from the image data values $d_n$ and a multiplication block 140 for forming the product of the offset corrected pixels and the gain correction values $g_n$ which correspond to the particular pixels. It is understood that for each of the n photosites on the sensor, an offset correction value $O_n$ and a gain correction value $g_n$ are computed when the system of FIG. 1 is placed in the "calibration" mode, which can either occur when the system is turned on, or at other intervals as directed by the user using a calibration control switch (not shown). In normal mode, the combination of the gain correction values $g_n$ and the offset correction values $O_n$ are provided by pixel correction memory 40.

Figure 4:
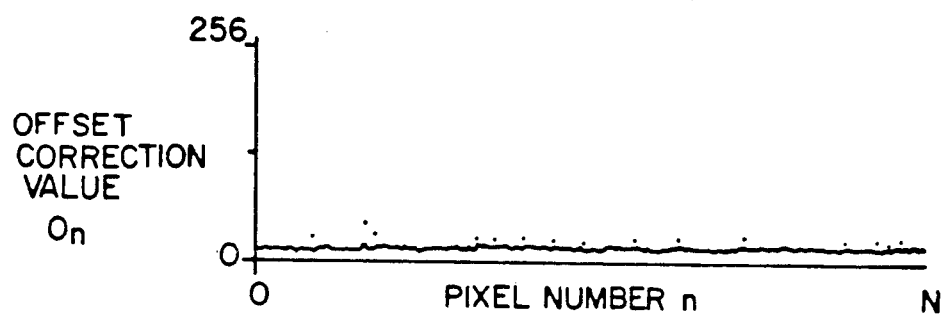
FIG. 4 graphically illustrates typical offset correction values corresponding to the pixels of a linear image sensor.

When placed in calibration mode, the illumination of the image sensor 10 in FIG. 1 is extinguished, either by turning off the light source 2 or by closing the lens aperture 4. In this situation, an ideal scanner would output an identical code value, referred to as the "black level" code value, for each pixel. Due to noise sources in the sensor and the other electrical circuits, this ideal is not normally achieved, and there are differences in the code values from different photosites. To the extent that these code value variations are due to "fixed pattern noise" which occur consistently, each time the sensor is read out, they can be corrected by subtracting off the offset correction values $O_n$ given by:

$$O_n = \left( \sum_{m=1}^{M} \frac{db_{n,m}}{M} \right) - \text{black level} \quad (1)$$

where "black level" is the desired black level code value and $db_{n,m}$ is the output value of mth readout of the nth pixel, with no sensor illumination. The offset values $O_n$ are thus equal to the average difference between the actual values from each pixel and the desired black level code value. M readouts are averaged to reduce the impact of temporally varying noise sources on the offset correction values. Typical offset correction values $O_n$ for a linear image sensor with N pixels and an eight-bit A/D are shown in FIG. 4.

Once the offset correction values have been calculated, the scanner begins the gain calibration by ensuring that the gain calibration object is in place. The gain calibration object can be a uniform white or grey substrate when capturing reflection images or real-world objects, or it can be a "Dmin" filter (a filter having a density corresponding to the minimum density of a nominal transparency material) or alternatively a clear "open gate" opening to the light source when capturing images from photographic film.

Figure 5:
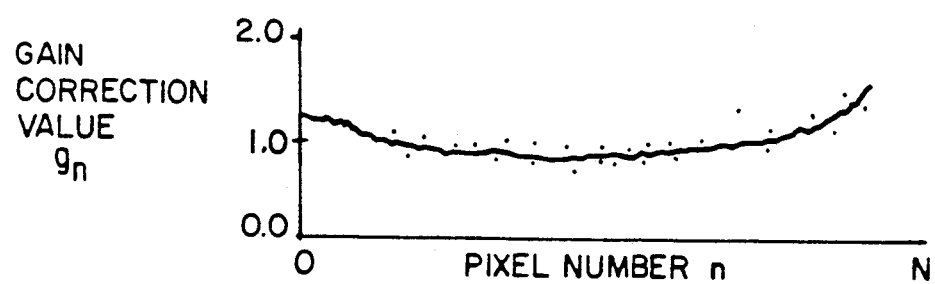
FIG. 5 graphically illustrates typical gain correction values corresponding to the pixels of a linear image sensor.

To perform gain calibration, the combination of the light source illumination level and lens aperture are set to provide the desired sensor illumination level. In this situation, an ideal scanner would output an identical code value, referred to as the "white level" code value, for each pixel. Due to sensitivity variations of the sensor photosites and non-uniformities in the illumination of the gain calibration object, this ideal is not normally achieved, and there are differences in the code values from different photosites. Again, to the extent that these code value variations occur consistently over time, they can be corrected out by multiplying by the gain correction values $g_n$ given by:

$$g_n = \frac{\text{white level}}{\sum_{m=0}^{M} (dw_{n,m} - O_n)} \quad (2)$$

where "white level" is the desired gain calibration code value and $dw_{n,m}$ is the output value of the mth readout of the nth pixel as the sensor is illuminated with the gain calibration object in place. The gain correction values $g_n$ are thus equal to the ratio of the desired "white level" value to the average code value for each pixel after offset correction. Typical gain correction values $g_n$ for a linear image sensor with N pixels are shown in FIG. 5.

It will be understood that the calculation of the offset and gain correction values, according to equations (1) and (2), indicated in block 30 of FIG. 1 can be done either with hard-wired circuitry, a microprocessor, or a computer, as is well known.

Figure 3:
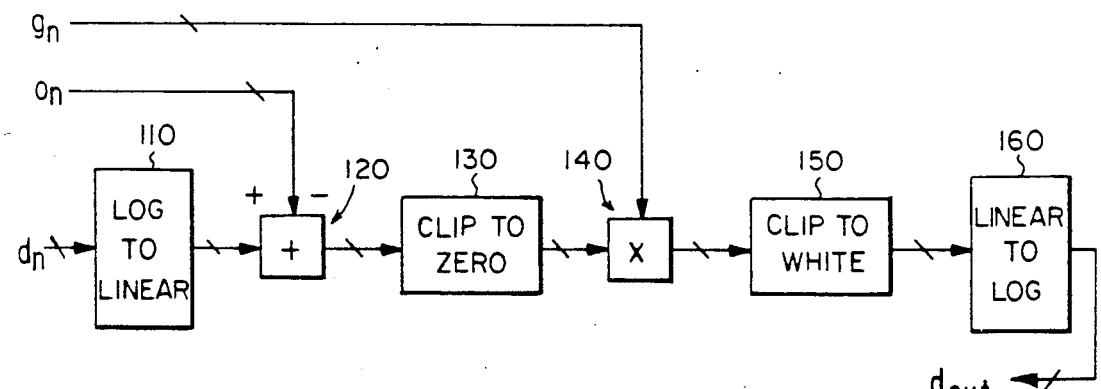
FIG. 3 illustrates a more complex prior-art gain and offset correction circuit.

FIG. 3 illustrates a more complex prior art correction system wherein the input image data signal $d_n$ is first linearized in a log-to-linear block 110 before the offset correction value is subtracted from the linearized output in block 120. This is necessary if the A/D converter 20 of FIG. 1 provides a logarithmically quantized digital representation of the signal output from sensor 10, which is desirable because it decreases the required bit resolution, and thus, the cost of the A/D 20. The signal is then limited to zero in a clipping circuit 130 to prevent undesirable negative values before the multiplication by the corresponding gain correction value is performed in block 140. The product signal is clipped to prevent undesirable values in block 150, then re-converted in a linear-to-logarithmic converter 160 to provide a logarithmically quantized output. Although the correction system of FIG. 3 produces a logarithmically quantized output, it will be understood that alternate output quantization functions, for example gamma correction, may be preferred in some applications.

The inventors of the present invention have recognized that the prior art correction circuit of FIG. 3 includes a series of look-up table functions and arithmetic functions (subtraction and multiplication), which when implemented using standard off-the-shelf digital integrated circuits requires a large number of devices, thus increasing the size and cost of the correction circuit. The inventors have also recognized that commercially available electrically programmable read-only memory (EPROM) integrated circuits typically used to implement the "log-to-linear" and "linear-to-log" look-up table functions in FIG. 3 contain many more address input lines than are required for the number of pixel data input bits normally used in such systems. The inventors have further recognized that the typical offset and gain correction values used in such correction circuits cover a limited range of values, as shown in FIGS. 3 and 4. Finally, the inventors have recognized that it is, therefore, possible to combine together some or all of the functions shown in FIG. 3 into the same EPROM look-up table.

Figure 6:
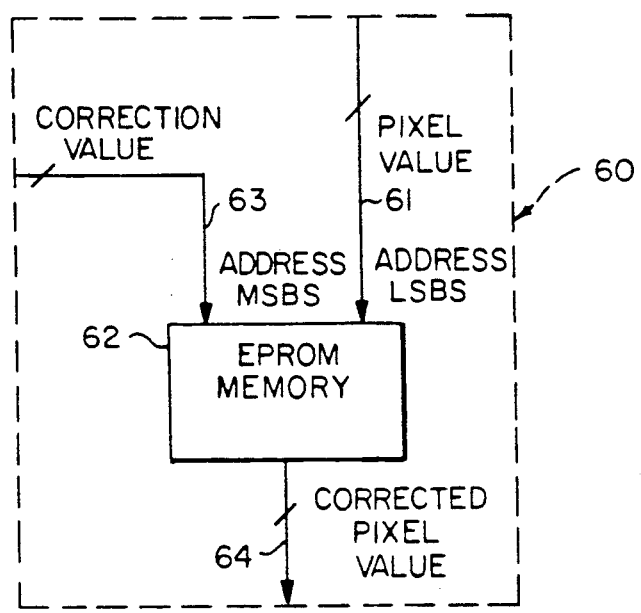
FIG. 6 is a block diagram illustrating a first alternate block for one of the blocks of FIG. 1.

A generalized block diagram of the present invention is shown in FIG. 6, which corresponds to block 60 of FIG. 1. The EPROM memory 62 of FIG. 6 includes address input lines which are split into two groups. The least significant bits (LSBs) 61 are connected to receive the $d_n$ data values from A/D 20 of FIG. 1, while the most significant bits (MSBs) 63 are connected to receive the correction values from pixel correction memory 40 of FIG. 1. The EPROM memory 62 data output lines 64 provide the corrected pixel output values.

Figure 9:
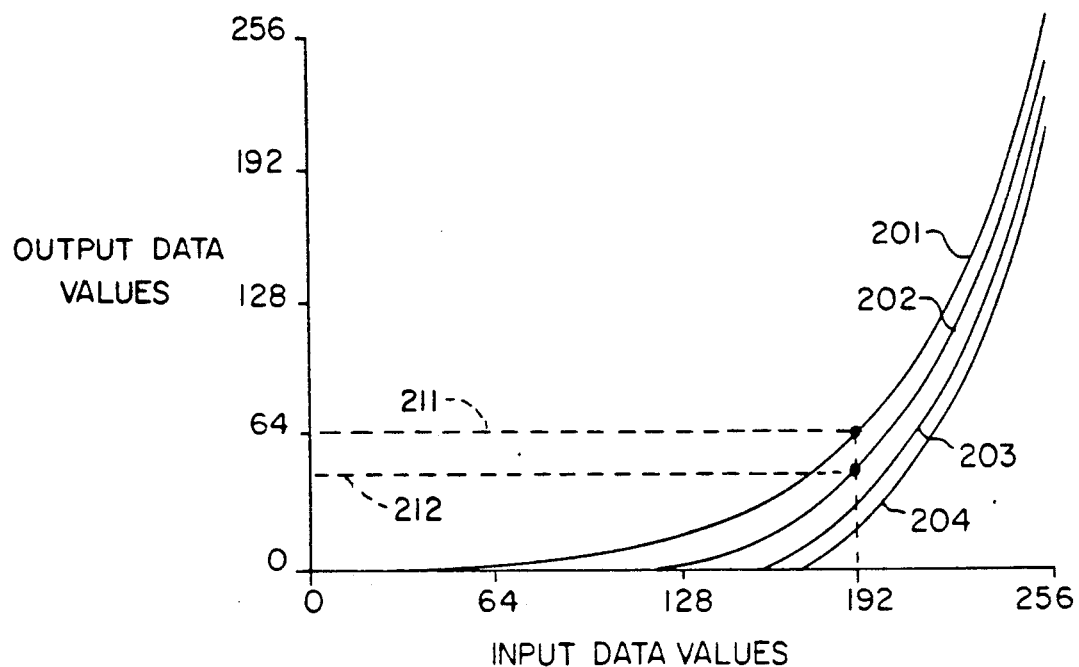
FIG. 9 graphically illustrates typical look-up table curveshapes for performing both logarithmic to linear conversion and black level correction.

The EPROM memory 62 can be programmed to provide numerous look-up table and correction functions, which will now be described in detail. FIG. 9 shows how three of the functions of the correction circuit shown in FIG. 3, specifically the log-to-linear conversion function 110, the offset subtraction function 120 and the "clip-to-zero" function 130 can be implemented in a single EPROM look-up table operation. The input data values shown on the horizontal axis of FIG. 9 are the eight LSB address inputs 61 to EPROM memory 62 in FIG. 6, since in this example, the A/D converter 20 of FIG. 1 provides an eight-bit logarithmically quantized output. The eight-bit corrected output data values shown on the vertical axis would appear at the output pins 64 of EPROM memory 62 of FIG. 6.

The four curves 201, 202, 203 and 204 shown in FIG. 9 show the four different mappings of eightbit input to eight-bit output data values which are programmed into EPROM memory 62 of FIG. 6. The mapping used for a each pixel of the sensor 10 in FIG. 1 depends on the corresponding correction value for that pixel stored in correction memory 40, which is input to the EPROM memory MSB lines 63 of FIG. 6. In this example, two-bit correction values are used, (EPROM 62 thus has a ten-bit input) in order to more clearly show the EPROM memory programming in graphical form. In a more typical system, however, a larger number of bits would be used to store the correction values.

In the example of FIG. 9, curve 201 shows the mapping which would be used for pixels with corresponding offset values equal to 0, as computed using equation (1). In this case, the curve shape is simply equal to the logarithmic-to-linear conversion function indicated by block 110 of FIG. 3, since $O_n=0$. If, for example, the input data value on address lines 61 of FIG. 6 equaled 192, the value at the output 64 of EPROM memory 62 would equal value 65, as indicated by the dotted line 211. If the offset value $O_n$ instead was equal to 16, the curveshape 202 would be used. This curveshape equals the log-to-linear function of block 110 of FIG. 3, followed by the offset subtraction block 120 with $O_n=16$, followed by the "clip-to-zero" function 130. If the input data value again was equal to 192, the output value would equal 49, as shown by dotted line 212, which is 16 less than the value given by curve 201. If the offset correction value $O_n$ instead was equal to 32, the curveshape 203 would be used, so the output of 33 would be provided when the input value equalled 192. Finally, when the $O_n$ value of the pixel is 48, the EPROM 62 of FIG. 6 is programmed to provide an output value of 17, (which equals 65 minus 48) for an input value of 192.

In this example, the value of the two address MSBs 63 of FIG. 6 determine which of the four curveshapes 201, 202, 203 or 204 is used to determine the output data values. When $O_n=0$, the correction calculation circuit 30 stores a two-bit binary 00 value into memory 40, and curveshape 201, which is programmed into addresses 0 to 255 of EPROM 62 is used. When $O_n=16$, the correction memory 40 contains a two-bit binary 01 value, and curveshape 202, which is programmed into addresses 256 to 511 of EPROM 62 is used. In similar fashion, $O_n=32$ is stored as binary value 10 and $O_n=48$ is stored as binary value 11 in correction memory 40 of FIG. 3.

As mentioned earlier, FIG. 9 shows the curveshapes for only four different $O_n$ correction values, to simplify the discussion. In typical systems, a much larger number of curveshapes would be used, one for each $O_n$ value to be corrected. The number of $O_n$ values required depends on the range of fixed pattern "black level" noise present and the required correction accuracy. Typically, the maximum $O_n$ value is less than one-eighth of the maximum data code value (less than 32 for an eight-bit $d_n$ value) so five bits are needed to represent $O_n$ with an accuracy equal to one LSB of the eight-bit data word. The EPROM 62 of FIG. 6 would thus require 13 address bits (8192 address locations) to store the 32 8-bit look-up tables.

One method for reducing the number of bits required to represent $O_n$ and $g_n$ is to restrict the maximum values they are allowed to take on and to treat any pixels which fall outside the limits as "defective" pixels. These "defective" pixels would be hidden by a defect concealment circuit which substitutes the value of the nearest "non-defective" pixel (or alternately the average value of nearby "non-defective" pixels) for the value of the pixel which has $O_n$ or $g_n$ values exceeding the limits. Such defect concealment circuits are well known in the art.

Figure 10:
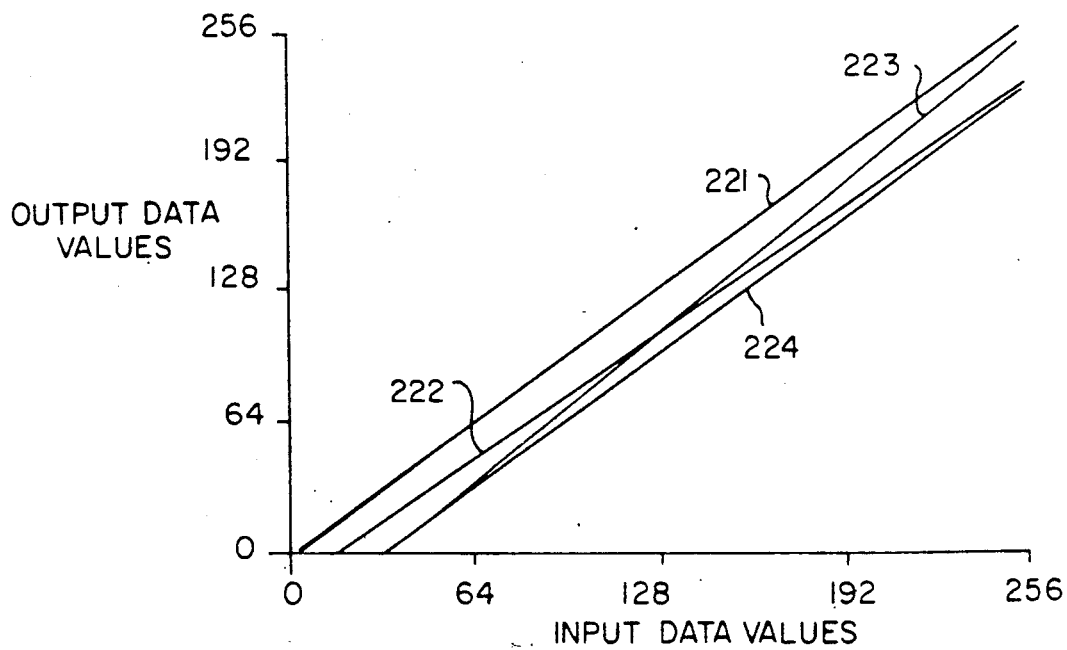
FIG. 10 graphically illustrates typical look-up table curveshapes for performing both the black level and gain correction functions of FIG. 2.

FIG. 10 shows look-up table mappings for a second embodiment of the invention, where the EPROM memory 62 of FIG. 6 is now programmed to perform the offset subtraction 120 and gain correction multiplication 140 operations shown in FIG. 2. Again, only four curves are shown, though in a typical application, EPROM 62 would store many more curveshapes, one for each combination of $O_n$ and $g_n$ values to be used. Curve 221 of FIG. 10 is used when $O_n=0$ and $g_n=1.0$, curve 222 is used when $O_n=16$ and $g_n=0.95$, curve 223 is used when $O_n=32$ and $g_n=1.1$, and curve 224 is used when $O_n=32$ and $g_n=1.0$.

Figure 11:
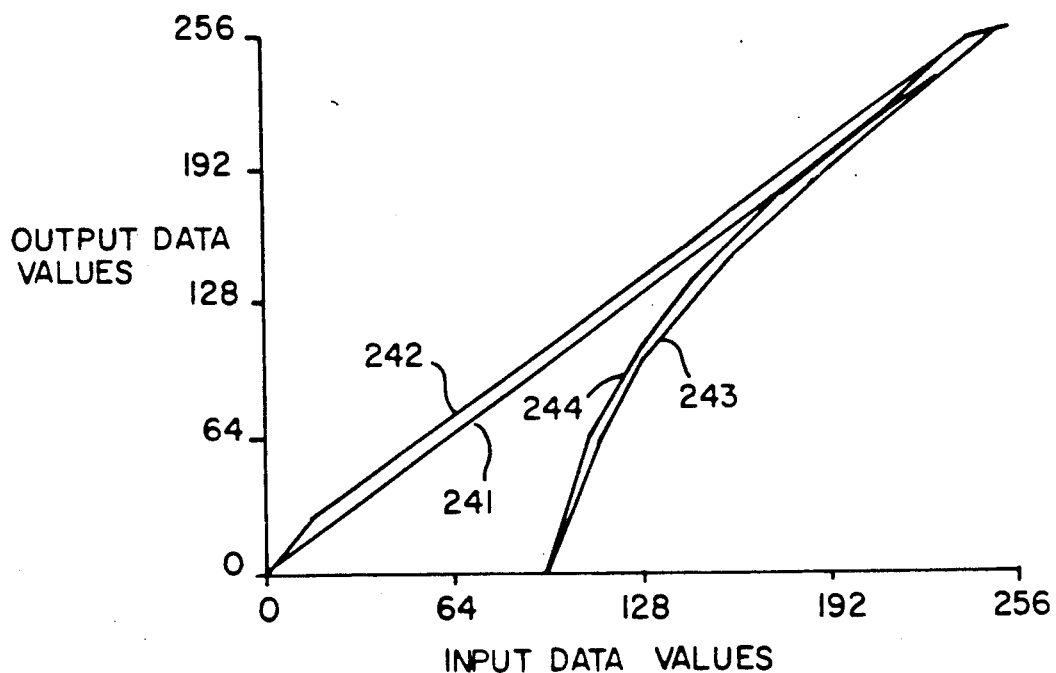
FIG. 11 graphically illustrates typical look-up table curveshapes for performing the functions shown in FIG. 3.

FIG. 11 shows look-up table mappings for a third embodiment of the invention wherein the EPROM memory 62 of FIG. 6 is now programmed to perform all of the functions of FIG. 3, including the log-to-linear conversion 110, the offset subtraction 120, the clip-to-zero function 130, the gain multiplication function 140, the clip-to-white function 150, and the linear-to-log conversion 160, in a single look-up table operation. Again, only four curves are shown, though in a typical application, EPROM 62 would store many more curveshapes, one for each combination of $O_n$ and $g_n$ values to be used. Curve 241 of FIG. 11 is used when $O_n=0$ and $g_n=0$, curve 242 is used when $O_n=0$ and $g_n=1.2$, curve 243 is used when $O_n=8$ and $g_n=1.0$, and curve 244 is used when $O_n=8$ and $g_n=1.2$.

In some systems requiring high bit precision, it is impractical to provide a single EPROM memory 62 with enough address bits to accommodate all of the data input bits and all of the required offset correction value and gain correction value combinations. In such an instance, the correction circuit shown in FIG. 7 can be advantageously employed. In this correction circuit, two EPROM memories, 362 and 368 are connected in series. The address input LSBs 361 of EPROM 362 are connected to the output of A/D converter 20 of FIG. 1. The correction value provided by pixel correction memory 40 includes two components, an offset correction value which connects to the address MSB inputs 363 of EPROM 362, and a gain correction value which connects to the address MSB inputs 365 of EPROM 368. The outputs 364 from EPROM memory 362 are connected to the LSB address lines of EPROM 368. The functions of FIG. 3 are then split between EPROMs 362 and 368. The first EPROM 362 performs the log-to-linear conversion function 110, the offset subtraction function 120, and the clip-to-zero function 130. The second EPROM 368 performs the gain correction multiplication function 140, the clip-to-white function 150, and the linear-to-logarithmic conversion function 160.

Figure 7:
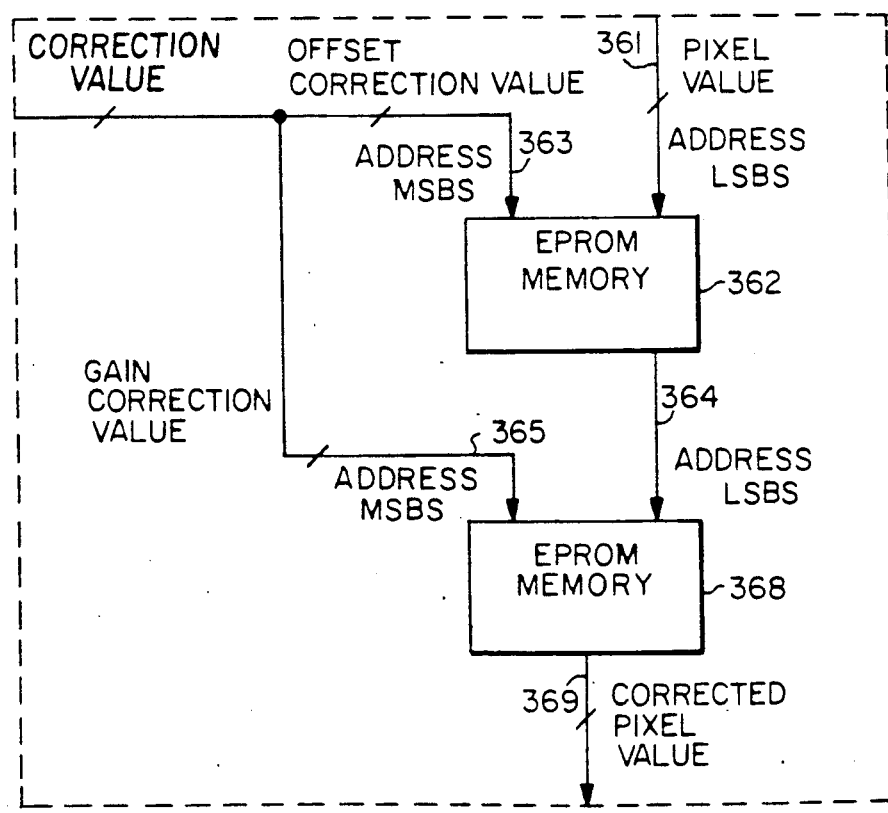
FIG. 7 is a block diagram illustrating a second alternate block for one of the blocks of FIG. 1.
Figure 8:
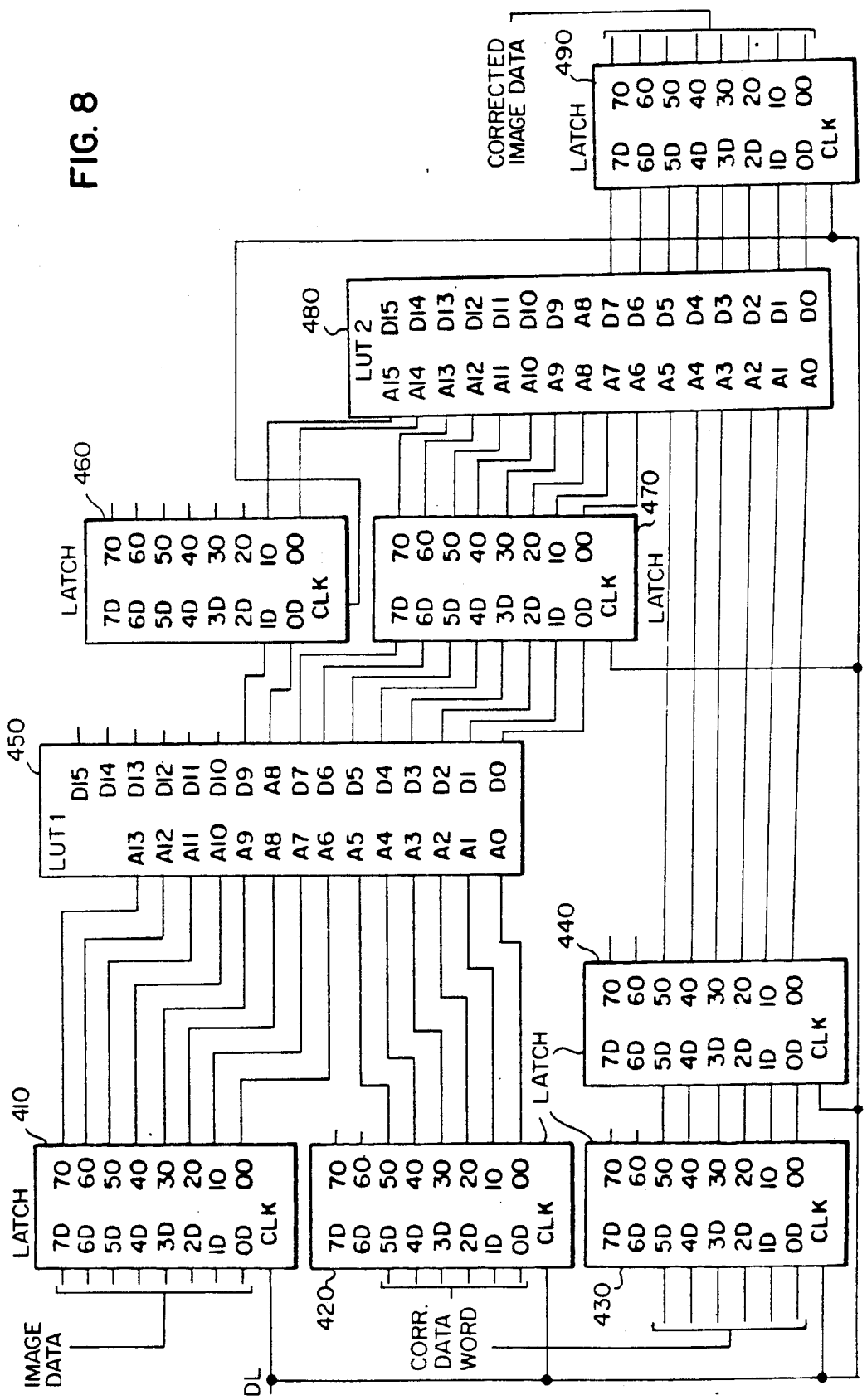
FIG. 8 is a chip level schematic of FIG. 7.

FIG. 8 illustrates a chip level schematic diagram of the correction circuit shown in FIG. 7. Image data proceeds through the system of FIG. 8 as follows:

1) The correction word (twelve bit) is presented to the correction circuit input, and is latched into registers 420 and 430 upon a positive edge to the data latch input (DL). The correction word consists of two six-bit values, representing the offset correction value and the gain correction value. The gain and offset values are represented as linearly quantized values.

2) The image data word (eight bit) is presented to the correction circuit input, and is latched upon a positive edge to DL. The pixel word consists of one eight-bit word. The image data values are represented as logarithmically quantized values.

3) The first look-up table 450 is programmed to perform three operations: a) convert the eight-bit log value to a ten-bit linear value, b) subtract the offset correction value, and c) clip negative values to 0. Ten bits are output from LUT 450. LUT 450 is a 16 K×16 EEPROM, part number TMS27C210, manufactured by Texas Instruments, Dallas, Tex.

4) The outputs of LUT 450 are latched on the next clock cycle into registers 460 and 470 after which they enter the second table 480, which is programmed to provide three operations: a) multiply the table input by the gain correction value, b) clip values above 1023 to code value 1023, and c) convert from a ten-bit linear to an eight-bit log value. LUT 480 is a 64 K×16 EEPROM, part number WS57C257-55D, manufactured by Wafer Scale Integration, Inc., Freemont, Calif. Latches 410, 420, 430, 440, 460, 470, and 490 are octal d-type flip-flips, part number SN74ALS273, manufactured by Texas Instruments.

5) On the next clock cycle, the output of LUT 480 is latched in register 490, and is available at the correction circuit output. In an alternative embodiment, registers 440, 460, and 470 could be eliminated and LUT 450 could be combined into one 1 M×eight-bit EPROM.

Unlike discrete adders and multipliers, the use of look-up tables to perform pixel correction does not restrict the "correction" input variables to only representing gain and/or offset values. Instead, the "correction" value represents a pointer to one of many look-up tables, which can be programmed to perform very complex corrections.

Figure 12:
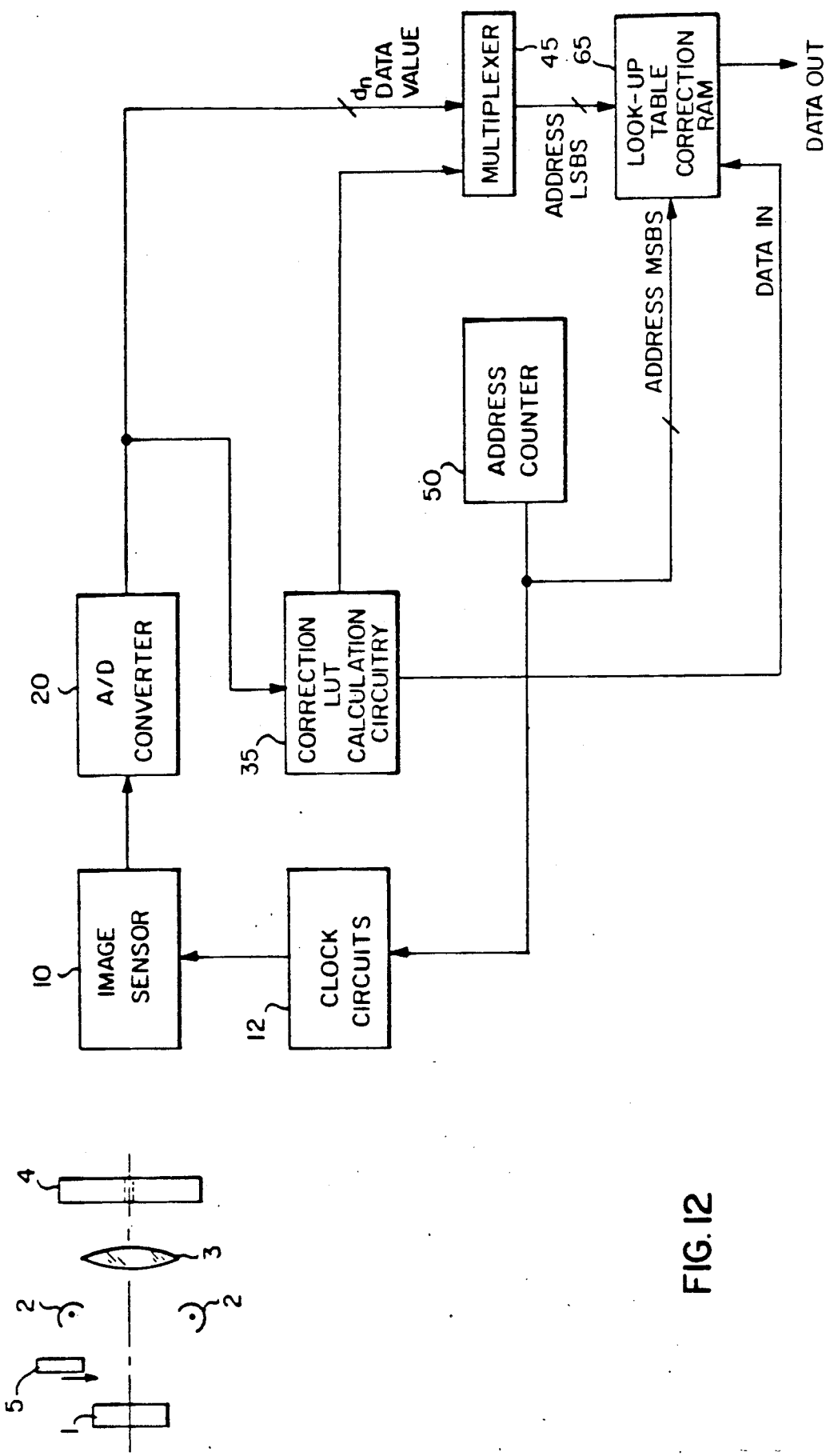
FIG. 12 is a block diagram of a second preferred embodiment of the invention.

FIG. 12 depicts a block diagram of a system for capturing and performing corrections on an image which provides improved correction compared to normal gain and offset correction.

In this system, there are N different look-up tables, one for each photosite on image sensor 10. During the calibration operation, the look-up tables for each of the N photosites are calculated by the correction look-up table calculation circuitry 35, and loaded into the proper address MSB and LSB locations in look-up table correction RAM 65 via "data in". In the normal image capture operating mode, the image data values $d_n$ provide the address LSBs to look-up table correction RAM 65 via multiplexer 45, while the address counter 50 provides the address MSBs, which value equals the pixel number n. If image sensor 10 is a linear array with 2048 elements and A/D 20 outputs eight bits, RAM 65 must have 512 K addresses.

If the black level offset and gain calibration technique described earlier in reference to FIG. 2 is used to provide the offset correction values $O_n$ and the gain correction values $g_n$ for each pixel n, it is clear that N look-up tables, similar to those shown in FIGS. 10 or 11, can be calculated to perform the correction operations shown in either FIG. 2 or 3, respectively. The inventors of the present invention have recognized, however, that by providing a more elaborate calibration procedure, using a range of sensor illumination levels, it is possible to create individual look-up tables for each pixel which provide more complete correction. This is desirable, because the variations in response of the signals from the photosites is often not completely linear, but rather varies in a slightly non-linear fashion, for example, as a result of the sensor antiblooming control structures and the output amplifier non-linearities.

As a result, it is preferable to perform the calibration at a range of sensor illumination levels, rather than at just the two levels (i.e. full illumination and no illumination) used to compute $g_n$ and $O_n$. One way to provide a range of illumination levels is to change the aperture 4 in FIG. 12 to a number of different settings while the gain calibration object 5 is in place. For example, the aperture can be first set to the value which provides nearly the maximum desired sensor output signal, and the gain correction values $g1_n$ can be calculated using:

$$ga_n = \frac{Da}{\sum_{m=0}^{M}(da_{n,m} - O_n)} \quad (3)$$

where Da equals the desired output code value for the ath aperture setting, $da_{n,m}$ equals the actual code value from the nth pixel during the mth scan of the ath setting, and $O_n$ is the offset correction code value calculated using equation (1). Next, the aperture can be set to provide a lesser illumination level, for example one-half the illumination of the a=1 setting, and equation (3) can be used to compute $g2_n$ values for each of the N photosites. The aperture can then be set to provide a number of lower illumination levels, and all of the $ga_n$ values can be computed. The number of illumination levels can range from two up to the maximum number of code values from the A/D 20, but a typical value is six different illumination levels. As an alternative to using a variable aperture 4, the gain calibration object 5 could include a number of uniform areas with a range of reflectances or transmittances to provide the different sensor illumination levels, or the exposure time of the image sensor 10 could be varied.

Figure 13:
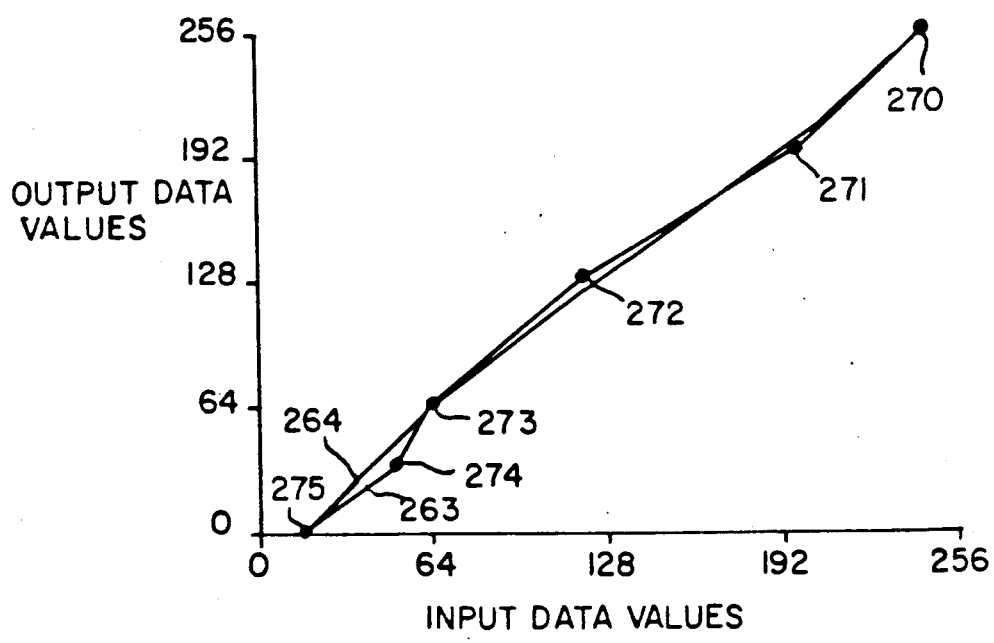
FIG. 13 graphically illustrates typical look-up table curveshapes for the system of FIG. 12.

Once the correction LUT calculation circuitry 35 has calculated the $O_n$ values and all of the $ga_n$ values, it then creates a look-up table for each pixel n which maps the average actual code values from the calibration step to the desired code values and provides an appropriate output corrected data value for every possible image data value $d_n$. There are many techniques for creating such look-up tables which are well known in the art, including linear interpolation of values between the calibration data points, and higher-order polynomial curve fitting methods. FIG. 13 includes two curves representing possible look-ups for one of the n pixels computed using the six calibration points 270, 271, 272, 273, 274 and 275. Curve 263 represents a look-up table calculated using linear interpolation of values between the six calibration points. Curve 264 represent a look-up table calculated using a 3d order polynomial curve fit of the six calibration points.

The LUT values calculated by LUT calculation circuitry 35 may also provide conversion of the image data to or from different quantization "spaces", such as log, linear, or gamma-correction quantization characteristics.

While many of the embodiments of the present invention have been described as using electrically programmable read-only-memory (EPROM) to perform the look-up table operations, many other types of digital memory, including static random access memory (SRAM) could be used. Furthermore, the correction could be performed in a general purpose computer or microprocessor, rather than in specialized digital circuits.

While there has been disclosed what is considered to be the preferred embodiments of the invention, it will be manifest that many changes and modifications may be made therein without departing from the essential spirit of the invention.

We claim:

1. An apparatus for correcting a plurality of picture element values from an image sensing array using at least two correction signals comprising:
    means for forming an image data signal from a plurality of picture element values;
    means for forming at least two correction signals from at least two correction values for each picture element of said image sensing array;
    first lookup table means having at least one input for receiving at least one correction signal and at least one additional input for receiving said image data signal for performing a first function on each picture element value of said image data signal in accordance with the value of one of the correction signals corresponding to said picture element of said image sensing array; and
    second lookup table means having at least one input for receiving at least one correction signal and at least one additional input for receiving said image data signal for sequentially performing a second function on each picture element value that has had the first function applied so as to provide a plurality of corrected picture element values.

2. An apparatus for correcting the output signal levels from an image sensing means incorporating an array of photosensitive elements comprising:
    means for creating an illumination image beam;
    at least one array of photosensitive elements positioned to receive the illumination image beam, each photosensitive element providing as an output a signal level that is a function of the illumination impinging thereon;
    means for converting the output signal levels from each of said photosensitive elements into digital signal values;
    means for determining a multiplicity of differing photosensitive element correction values corresponding to a multiplicity of different photosensitive elements of said array;
    means for storing each of said photosensitive element correction values;
    means for controlling said stored photosensitive element correction value storage means and said array of photosensitive elements to concurrently provide the digital values of the output signal levels from the photosensitive elements and the corresponding correction values for said photosensitive elements; and
    means for correcting the output signal levels from said array of photosensitive elements incorporating a digital memory which is addressed using both the digital values of said output signal levels from the photosensitive elements and said correction values from said means for storing.

3. An apparatus according to claim 2 wherein said means for correcting performs black level correction.

4. An apparatus according to claim 2 wherein said means for correcting performs gain correction.

5. An apparatus according to claim 2 wherein said means for correcting is comprised of two cascaded digital memories, and said photosensitive element correction values are composed of two components, each of which is used to address one of the two cascaded memories.

6. An apparatus according to claim 2 wherein said means for correcting also performs a conversion function on the digital signal values.

7. An apparatus according to claim 2 wherein said means for correcting performs both a black level correction and a gain correction.

8. An apparatus according to claim 3 wherein said means for correcting also performs a conversion function on the digital signal values.

9. An apparatus according to claim 4 wherein said means for correcting also performs a conversion function on the digital signal values.

10. An apparatus for correcting the output signal levels from an image sensing means incorporating an array of photosensitive elements comprising:
    means for creating an illumination image beam;
    at least one array of photosensitive elements positioned to receive the illumination image beam, each photosensitive element providing as an output a signal level that is a function of the illumination impinging thereon;
    means for converting the output signal levels from each of said photosensitive elements into digital signal values;
    means for creating at least three different calibration exposure levels for said array of photosensitive elements; and
    means for calculating digital correction look-up tables for a plurality of the photosensitive elements of said array based on the digital signal values created during said calibration exposures.

11. An apparatus according to claim 10, and further comprising means for correcting the output signal levels from said array of photosensitive elements where said means for correcting incorporates a digital memory which is addressed using both the digital values of said output signal values from the photosensitive elements and a value identifying the photosensitive element to be corrected.

12. An apparatus according to claim 11, wherein said means for correcting also performs a conversion function on the digital signal values.

* * * * *